Sept. 6, 1960 A. M. STOTT ET AL 2,951,338
EXPLOSIVELY ACTUATED CONTROL DEVICE
Filed Sept. 12, 1957 2 Sheets-Sheet 1

INVENTORS
ALBERT M. STOTT
HERBERT A. MAGNUS
BY
W. E. Thibodeau, T. J. Lynch & H. R. Johns
ATTORNEY

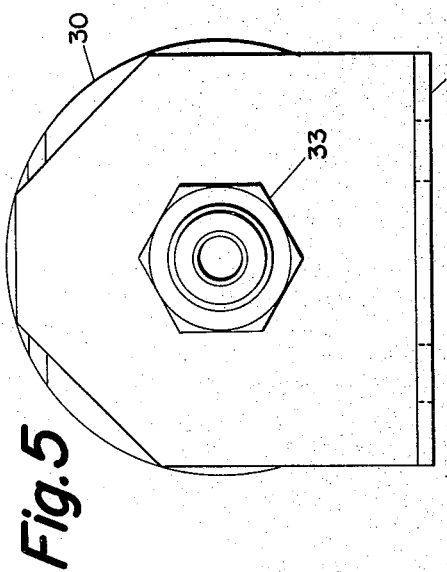
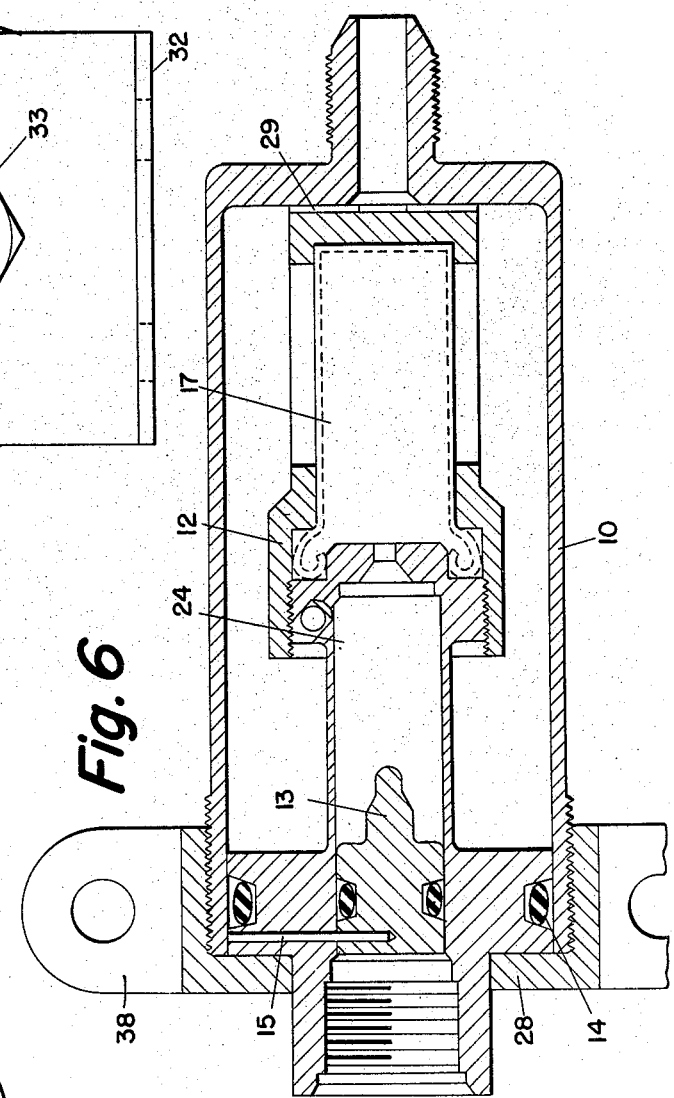
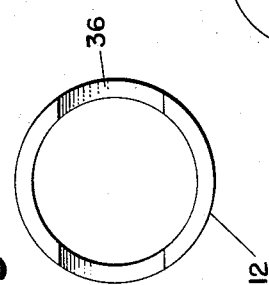
INVENTORS
ALBERT M. STOTT
HERBERT A. MAGNUS
BY
W. E. Thibodeau, T. J. Lynch & H. R. Johns
ATTORNEY

United States Patent Office 2,951,338
Patented Sept. 6, 1960

2,951,338

EXPLOSIVELY ACTUATED CONTROL DEVICE

Albert M. Stott, Aldan-Clifton Heights, Pa., and Herbert A. Magnus, Branford, Conn., assignors to the United States of America as represented by the Secretary of the Army Filed Sept. 12, 1957, Ser. No. 683,673

3 Claims. (Cl. 60—39.47)

(Granted under Title 35, U.S. Code (1952), sec. 266)

The invention described herein may be manufactured and used by or for the Government for governmental purposes without the payment of any royalty thereon.

Our invention relates to means adapted to initiate certain steps involved in the operation of aircraft escape systems or the like, and has for its principal object the provision of an improved initiator which is gas triggered to fire a cartridge for generating a control gas.

The cartridge so fired may be of the instantaneous or time delay type, and the gas developed by it may be filtered to remove burning particles and thereafter applied through a hose to the actuating element of a device to be operated. The devices to be operated may be of various types such as a device to jettison the tail turret of an aircraft or a lap belt release. As applied to aircraft escape systems, our invention has the important advantage that it may be utilized to defer operation of one or more devices without discontinuity in the escape sequence.

Our invention will be better understood from the following description considered in connection with the accompanying drawings and its scope is indicated by the appended claims.

Referring to the drawings:

Fig. 4 is a sectional view of the cartridge retainer taken on the line 4—4 of Fig. 1, Fig. 5 is a view taken at the right-hand end of Fig. 1, and Fig. 6 illustrates a slightly modified form of the initiator.

Figure 1:
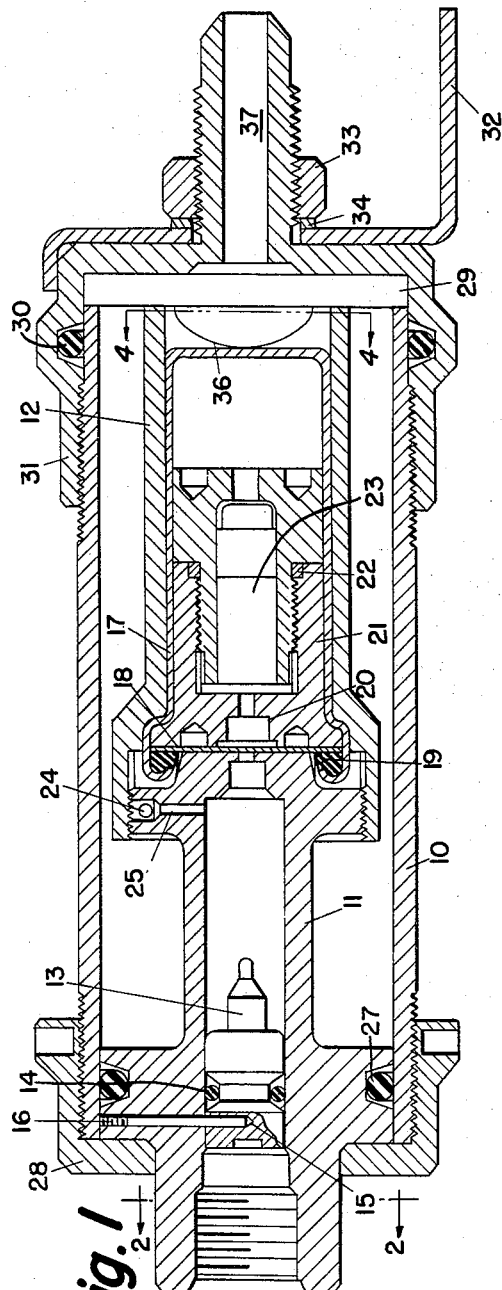
Fig. 1 is a sectional view illustrating one form of our invention.

The initiator of Fig. 1 includes a body 10 within which are mounted a firing pin guide 11 and a cartridge retainer 12. A firing pin 13 with an O ring 14 is mounted within the firing pin guide 11 and retained in place by a shear pin 15 which is backed by a headless screw 16.

A cartridge 17 is mounted within the retainer 12. This cartridge includes a sealing disk 18 which is held in place by an O ring 19 interposed between the disk and a turned over edge of the cartridge casing 17. Within the casing 17 are a primer 20, a primer retainer 21, an O ring 22 and a delay body 23.

A ball 24 in a vent 25 in the firing pin guide 11 is provided to release the air ahead of the firing pin and to prevent the leakage of gas back into the firing pin guide after the cartridge has been fired.

Figure 2:
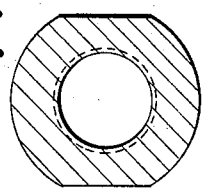
Fig. 2 is a cross section of Fig. 1 taken at the line 2—2 of Fig. 1.

With the ball 24 in the vent 25 and with the cartridge in its retainer, the retainer is screwed into the firing pin guide. This assembly with an O ring 27 is slid into the body 10 and the head cap 28 is screwed on. A section of the firing pin guide taken on the line 2—2 of Fig. 1 is shown in Fig. 2.

A filter 29 is placed over the other end of the body 10 and the end cap 31 with the O ring 30 is screwed on. Adjacent the end cap 31 is a mounting bracket 32 which is fixed in place by a nut 33 and a lock washer 34.

Figure 3:
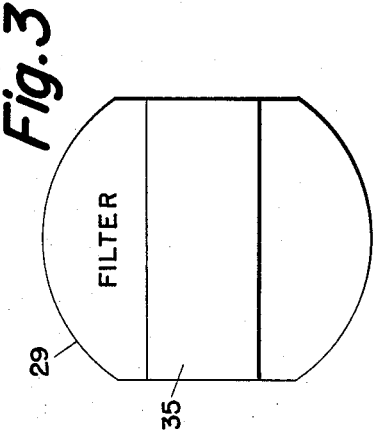
Fig. 3 illustrates certain details of a member utilized to filter burning particles from the gas before it is delivered from the output of the initiator.

It will be noted that the cartridge container 12 is slotted at its end as indicated at 36 in Figs. 1 and 4. The filter member 29 is of the shape indicated by Fig. 3, having at its opposite sides a slot 35. At the opposite ends of the slot 35, the member 29 is cut away so that the escaping gas must pass over the upper surface of the member 29 and back over its lower surface to reach the exit 37. This has been found to be an effective means of preventing the escape of hot particles and cooling the gas to a temperature low enough to avoid injury to the tubing connected to the exit 37.

The initiator of Fig. 6 is similar to that of Fig. 1 in most respects as indicated by the reference numerals common to these two figures. They differ in that (1) the discharge and closure of the initiator shown in Fig. 6 is integral with the cylindrical body 10 and (2) a different type of mounting bracket 38 is provided. With this arrangement, the firing pin guide and cartridge retainer assembly is slid into place through the head end of the initiator and the head cap 28 is screwed into place. As in the case of the initiator illustrated by Fig. 1, the cartridge used in the initiator of Fig. 6 may be of either the instantaneous or time delay type.

Gas for operating these initiators may be derived from any suitable source. If its pressure is from 500 to 1000 pounds per square inch, the pin 15 will shear, and the firing pin 13 will be forced through the guide 11 into contact with the percussion primer 20. After the primer initiates the cartridge 17, pressure is generated in the body 10. Shallow grooves 35 at the bottom of the retainer restrict the passage of burning particles and filter the gas. This is desirable for the reason that the exhaust gas is often delivered through a hose to the activating element of the device to be operated.

If the cartridge 17 is of the time delay type, the primer 20 will initiate the delay body 23, and, after a predetermined time delay, the main powder will burn to generate the required gas pressure. Basically, this unit is a gas fired, time controlled gas generator.

We claim:

1. A gas triggered initiator including an enclosure having a gas inlet and outlet, a firing pin guide extending inwardly from said inlet, a cartridge retainer threaded onto the inner end of said firing pin guide, a firing pin arranged to travel in said guide, means severable in response to a predetermined range of pressures for retaining said firing pin at the outer end of said guide, and a valve arranged to release air ahead of said firing pin and to exclude leakage of gas from said enclosure and cartridge retainer into said guide.

2. A gas triggered initiator according to claim 1 wherein said cartridge retainer contains a cartridge having a time delay charge.

3. A gas triggered initiator according to claim 1 wherein a filter member is arranged at the outer end of said cartridge retainer to provide a reversed transverse path between said retainer and said outlet.

References Cited in the file of this patent

UNITED STATES PATENTS

| | | |
|---|---|---|
| 1,328,088 | Lutz | Jan. 13, 1920 |
| 2,140,214 | Temple | Dec. 13, 1938 |
| 2,476,857 | Grafinger | July 19, 1949 |
| 2,736,236 | Martin | Feb. 28, 1956 |
| 2,780,961 | Musser | Feb. 12, 1957 |
| 2,815,008 | Hirt | Dec. 3, 1957 |
| 2,831,431 | Stevenson et al. | Apr. 22, 1958 |
| 2,869,463 | McKnight | Jan. 20, 1959 |